United States Patent Office 3,338,370
Patented Aug. 29, 1967

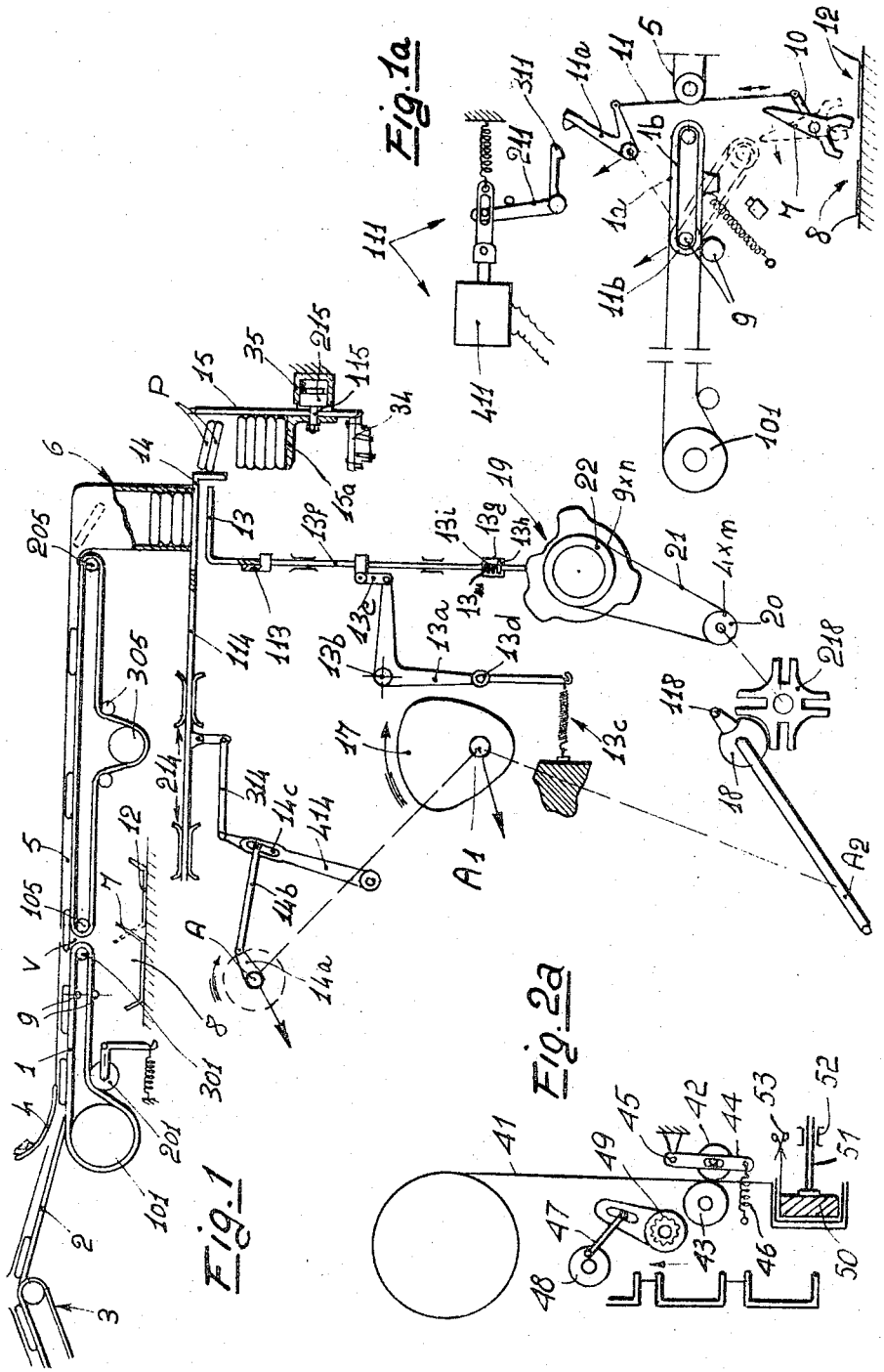

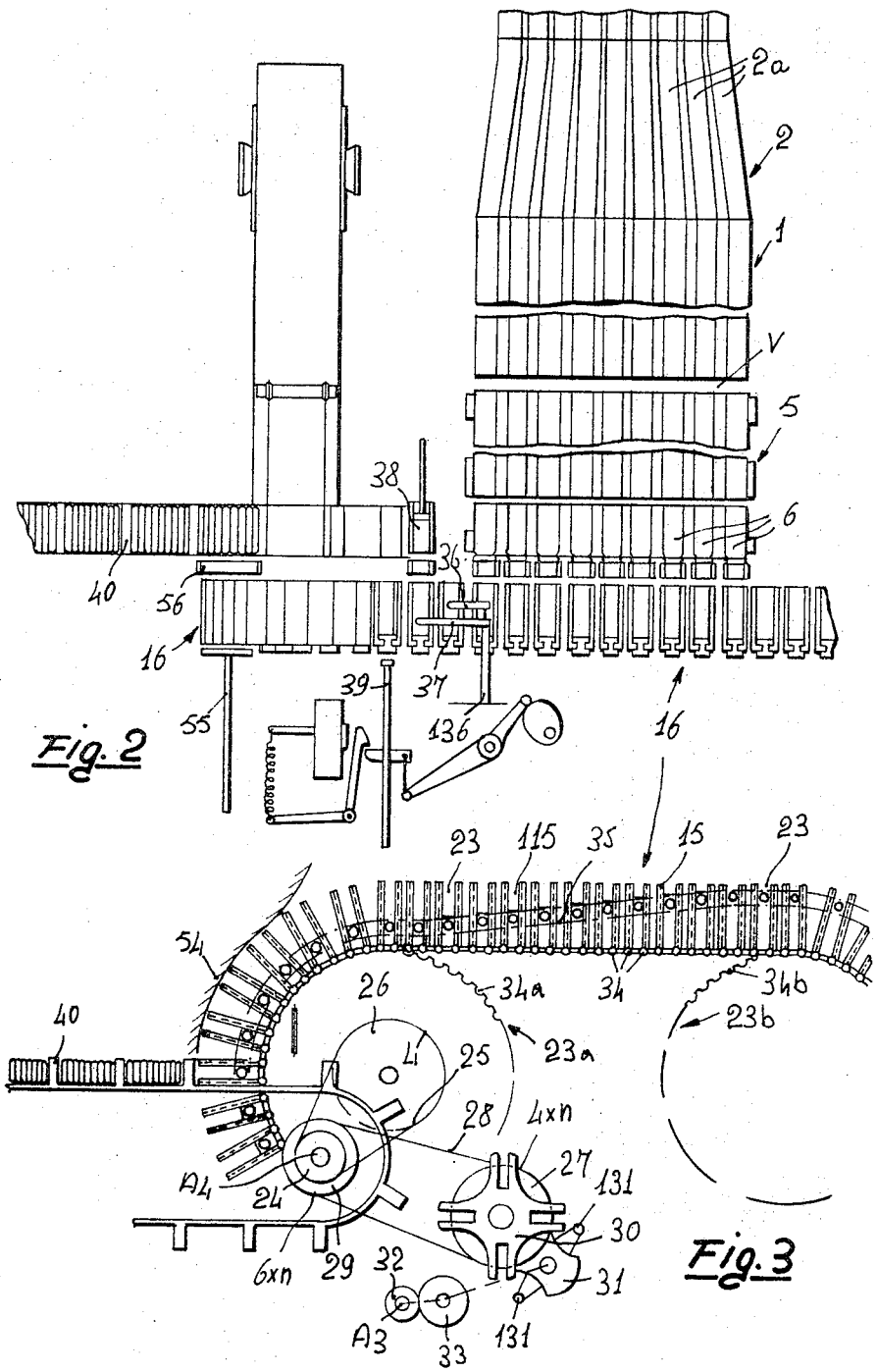

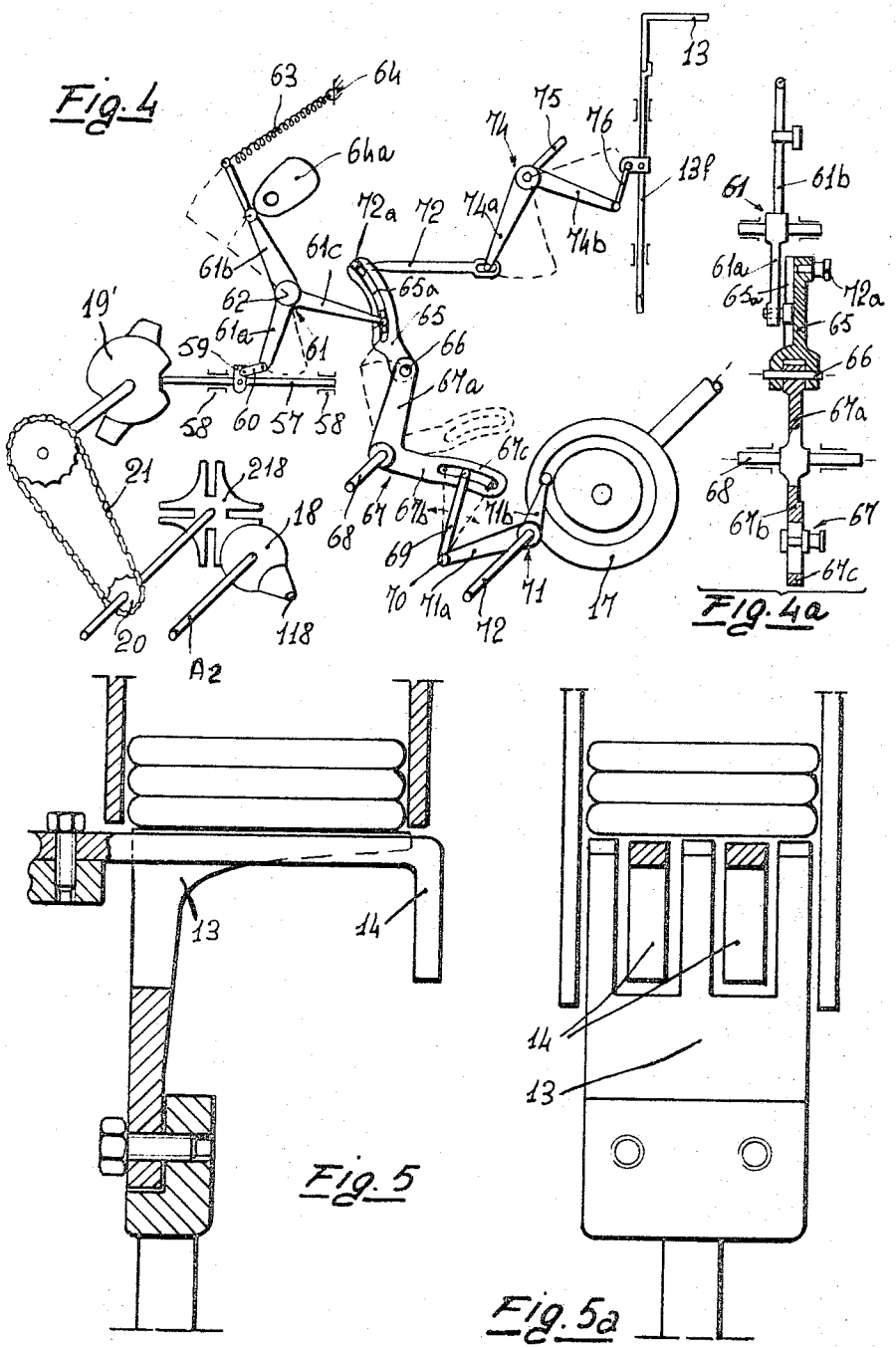

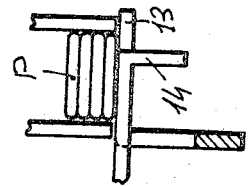
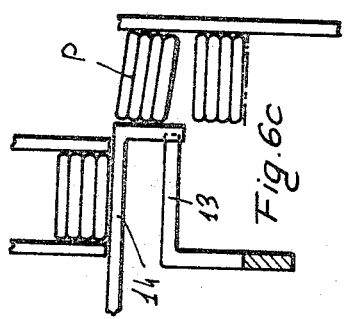
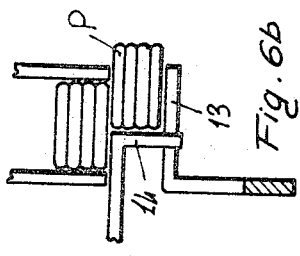
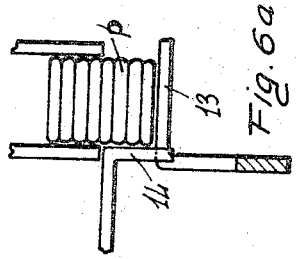
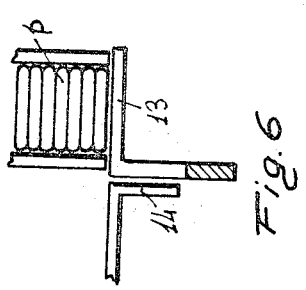
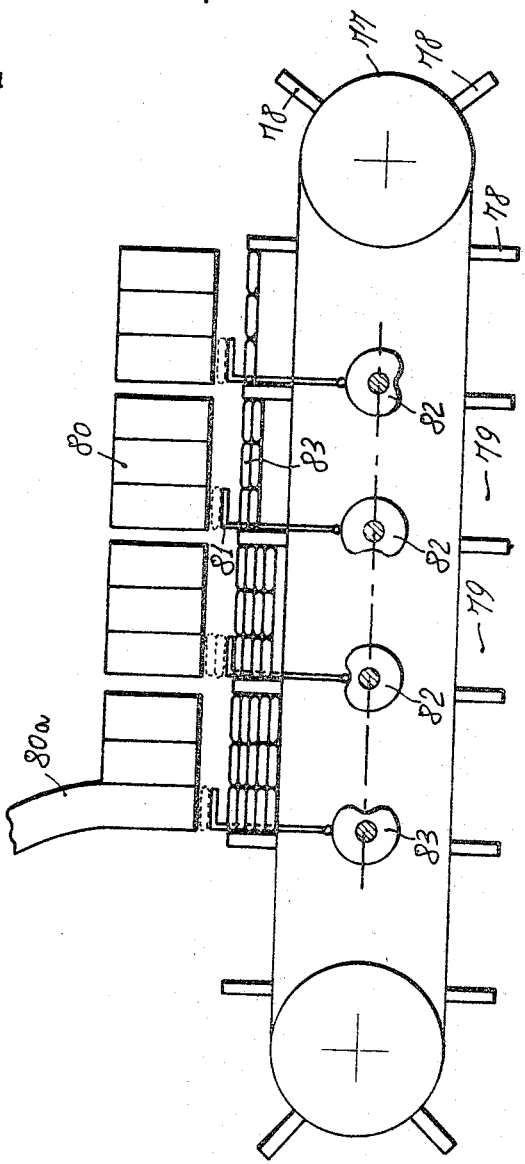

3,338,370
APPARATUS FOR GROUPING ARTICLES INTO PILES
Maurizio Maulini, Bologna, Italy, assignor to Azionaria Costruzioni Macchine Automatiche A.C.M.A. S.p.A., Bologna, Italy
Filed July 16, 1965, Ser. No. 472,584
Claims priority, application Italy, July 18, 1964, 15,882/64
7 Claims. (Cl. 198—24)

This invention relates to an apparatus adapted to group articles into a plurality of piles of preestablished height and collected from a number of rows and fed thereto by a continuous feeder, and to pre-arrange the formed piles of articles for wrapping operations performed by a subsequent packaging machine.

In particular, said apparatus is capable of transferring and piling up biscuits coming from a continuous oven to prepare them for and deliver them to subsequent wrapping.

In the biscuits industry, there exists the trend to produce different sizes of packages consisting of a preestablished number of articles to meet determined commercial requirements. The packages could, in fact, contain, e.g., 20, 30 piled-up articles. It is likewise well known that in said industry use is made of continuous ovens, in which the product is disposed in several parallel rows; and the number of rows may vary from case to case depending upon the type of production concerned in relation to the dimensions of the product and the width of the oven.

Consequently, it often occurs that packages should be made, containing a number of articles different from, and not a multiple of, the number of rows of the articles disposed in to the oven, so that several considerable difficulties may arise in connection with conveyance and stacking of articles whenever a collecting action should be developed over the entire front of the oven.

One of the main objects of the present invention is to provide an apparatus for grouping into stacks or piles articles collected from any desired number of rows over the entire front of the oven, so as to exclude no row and to build piles of any desired number of articles in order to convey the whole production from the oven to the packaging machine or machines in a substantially automatic manner.

It is another object of this invention to adapt the speed of the packaging machine to that of the oven, in such a way that the hourly quantity of the product is fully absorbed by the packaging machine.

It is still another object of this invention to check the integrity of the article in order to avoid packaging broken articles.

These and still other important objects are attained by the apparatus according to the present invention, which is essentially characterized by comprising a plurality of containers or hopper members for the temporary storage of articles, each corresponding to one of the rows of articles to be grouped, at least one feeder adapted to operate in conjunction with said containers as conveying means for the articles arranged in rows from the pickup zone to the temporary collection zone, conveying means for the rows of articles adapted to space the rows from each other in such a way as to present each row to a corresponding stacking container or hopper, a loader chain consisting of loaders or stacker members spaced from each other stepwise and adapted to be displaced stepwise in front of said stacking containers, so that at each station there is normally one loader located at least in front of one stacking container, means being provided for the transfer of items from the container to the corresponding loader during the stopping of the chain.

Each loader or stacker member has advantageously a movable bottom, which is slideably guided within the body of the loader itself and slideably engaged by outer support means adapted to ensure the lowering of the bottom by a predetermined measure at each displacement step of the loader.

The bottom plate members of said stacking containers or hoppers are suitably movable and operable by cam means, whilst cooperating with the conveying means for the articles from the stacking containers to related loaders, to the effect of presetting to such means a preestablished number of articles (or none) to be conveyed, both members being operable in phase.

Provision is advantageously made for a surveying device based on the final filling degree leveling of the loaders comprising sensitive member operable by the articles and control organs for the introduction and expulsion of articles cooperating with auxiliary supply and collection storehouses.

The feeder of the stacking containers or hopper members is conveniently comprises consecutive belt conveyors, longitudinally separated by an interruption zone or gap the width of which is adjustably provided such as to cause broken articles and/or articles of inadequate longitudinal dimensions to fall through the gap.

The movable step system of the chain loaders is advantageously provided with the coupling to another step conveyor for following up relationship with an automatic packaging machine, conveying means being provided by a loader in a corresponding receiving space of said conveyer in following up relationship and kinematic means being provided to aptly maintain the movement and stopping phases of the two cooperating conveyors.

Further features and advantages of the invention will become more apparent from the following detailed description of a preferred non-limiting embodiment of an apparatus for collecting articles from more rows and grouping the articles into piles of determined height according to the present invention when taken in conjunction with the accompanying drawings, in which:

FIG. 1 shows a general scheme of the apparatus viewed from the side, comprising the essential members;

FIG. 1a shows a detail of FIG. 1 relative to device for the deviation or rejection of the product;

Figure 8:
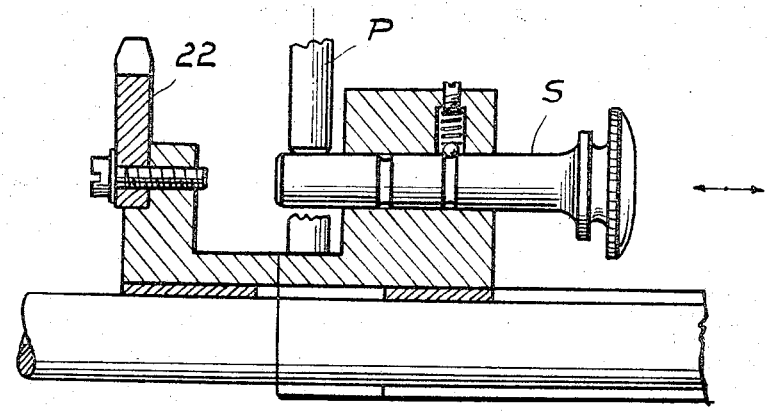
Figure 9:
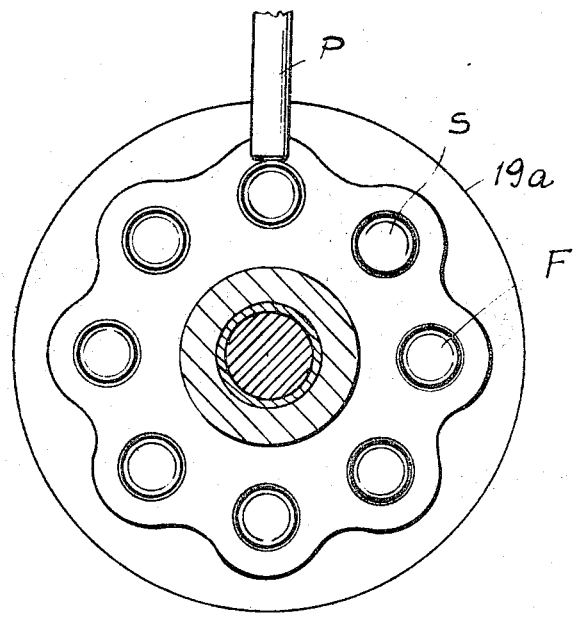

FIG. 2 is a plan view of an assembly for ordering the rows of articles (biscuits) and feeding them to the inlet in a greater scale as compared to FIG. 1, said representation including a testing and leveling device for the product set in grouping piles, and a group in a follow-up connection with a packaging machine, adapted to carry out by itself a partial paper wrapping of the product at the outlet of the main apparatus;

FIG. 2a is an overturned view of such wrapping group;

FIG. 3 represents in a front view a detail of the apparatus according to FIG. 2 in cooperation with said means in following-up connection with an automatic machine;

FIG. 4 and FIG. 4a show the scheme of a kinematic motion mechanism provided for the control of the product supporting member inside the aforementioned stacking containers;

FIGS. 5, 5a show in side and front views respectively and in enlarged scale partially in section, details relating to a pair, formed of a product supporting and transferring member, operating inside one of said containers;

FIG. 6, 6a, 6b, 6c and 6d schematically show an operating sequence of such members;

FIG. 7 is the front view of a particular embodiment of the step conveyor which may be replaced by that in FIG. 3;

FIGS. 8 and 9 show modification of certain details.

With reference to the aforementioned figures, in which the same members are designated with the same reference numbers, the apparatus represented comprises a feed assembly (FIG. 1) formed of a first belt conveyor 1 towards which leads a conveyor 2 (FIGS. 1, 2) placed with a slope in the form of a chute supplied from above by a conveyor 3 for the product, for example biscuits proceeding from a continuous oven (not represented). At the outlet of the conveyor there are present elastically yielding means 4 for braking the arriving product, the conveyor being formed of a plurality of ducts 2a (FIG. 2), which are progressively spaced from each other fanwise over a certain section in such a way as to widen the overall front of the rows arriving on the conveyor 1. A second belt conveyor 5 follows the conveyor 1 and feeds by itself a plurality of stacking containers or hopper members 6 which will be hereinafter described. Each belt conveyor is provided with driving and tension rollers designated 101, 201, 301 and 105, 205, 305, respectively; furthermore, said conveyors are spaced from each other so as to leave a space or gap V having such a width as to allow the passage from the one to the other belt only of entire biscuits with a determined length, whilst those incomplete can fall through the space or gap under which is an orientable chute (FIG. 1a), adapted to convey the aforementioned pieces to an underlying collector 8. From FIG. 1a it can be seen that said chute is kinematically connected with the head 1a of the belt conveyor 1 which head is by itself orientable toward the lower part since it is rotatable around the auxiliary supports 9. The kinematic connection is carried out via the lever 10 and tie rod 11 connected to a lever 11a rigidly connected through the axis 11b with the support 1b of the aforementioned orientable head 1a. Such arrangement enables the transferring of the product to another container 12 when for any reason whatever the belt 5 and/or the following-up packaging machine should stop, both belts being independently motorized by well known means, there being provided an electro-mechanical mechanism 111 (FIG. 1a), provided with a rocking member 211 with a beak 311, adapted to normally withhold the lever 11a and to release it when under the action of an electromagnet 411, electrically connected to the supply circuit of the following-up packaging machine with interposed known means for the closing of the electric circuit operating to the effect of exciting the electromagnet 411 when the current supplied to the aforementioned machine is interrupted.

As mentioned above, the belt conveyor 5 leads towards the stacking containers or hopper members 6. Each container is in turn provided with a movable bottom plate member constituted of a support 13 (FIGS. 1, 5, 5a, 6) of comb like-structure, which is crossed in the comb spaces by a pusher 14 which is just adapted to slip off the articles P (biscuits) underneath the piles for putting them into the respective loader or stacker member 15 pertaining to the step conveyor 16 placed before the stacking containers 6 (see in this respect FIGS. 1, 2, 2a in plan view and 3 in front view). Also the pushers 14 are make comb-like, so that they can act on the product as may be clearly seen in FIG. 6, crossing the underlying support 13. The motions of both members 13, 14 are kinematically combined as may be schematically seen from FIG. 1 in such a way as to progressively accomplish the take-off of desired articles and the support of the remaining pile before the pusher carries out its return travel. This can be easily seen from FIG. 6 which fixes up several instants of a take-off stage of the products (in this case four biscuits are involved) from the bottom of a hopper member to put them into a collection loader or stacker 15 for the formation of piles having a well-defined height.

The mechanic control of the pusher 14 is given for example by a rod 114 guided in 214 and articulated in a connecting rod 314 hinged in turn on a lever 414 provided with eyelet 14c in which is adjustably articulated a connecting rod 14b engaged with a related crank 14a, carried by a cyclic shaft A to which are connected with ratio 1:1 the rotating shaft A1 of a cam 17 and the shaft A2 rigid with a wheel 18 provided with pawl 118. The cam 17 is, in fact, adapted to control the support 13 relevant to each pile of product. All supports 13 are transversely connected to each other by the bar 113 (visible in section in FIG. 1), which is suitably guided. To control is being delivered by a rocking member 13a pivoted in 13b, spring biased in 13c, provided with roller 13d and engaged with one small connecting rod 13e connected to the rod 13f which carries the support 13 subjecting it also to the influence of the return spring 13c.

At this stage it will be understood that, whilst the lifting stroke of the support or bottom plate member 13 terminates at a fixed level such as to leave the pusher 14 to freely pass, the descending stroke is delimited by a cam 19, adapted to fix with its shaped contour the end of stroke of the rod 13f, and consequently the overall height of the operating zone of the pusher at the related container. In FIG. 1 one may see for example the collecting of two biscuits, whilst in FIG. 6 the collecting of four biscuits may be seen. In connection with the kinematic means controlling the cam 19 one may vary at will the lower stopping position of said rod 13f depending upon the contour of the cam 19 itself.

The cam 19 is connected through the pinion 22 by means of chain 21 to a pinion 20 having for example a 9xn/4xn ratio, which pinion is in turn rigidly connected to a Maltese cross 218 engaged by a pawl 118 rigid with the shaft A2.

At its lower end destined to cooperate with the cam 19 the rod 13f is provided with a damping structure constituted for example of the telescopic coupling of two of its sections formed like a cylinder 13g and piston 13h with interposed spring 13i. The cylinder portion 13g is provided with a calibrated throttling hole 13m in communication with the atmosphere, so that the air entering and leaving said cylinder 13g acts as a damping cushion proper.

It will be understood that such system will ensure to collect gradually one single article or one group of articles at a time, in such a way as to build in a determined time interval a number of piles of a prefixed number of articles as the sum of all collecting operations. The collection may be substantially carried out over the entire front of the hoppers, the belt conveyor in front of them being shifted progressively stepwise, so that each individual stack member is filled with the contribution of a plurality of hoppers, while it successively stops before each of them.

By way of example, suppose that one must form groups of sixteen biscuits per stacker member by collecting operations over a front of nine rows (nine hoppers). Any stacker member, displacing stepwise will accomplish in the total nine stops, one at each hopper. For the first three stops, it could for example receive one biscuit at a time, for the successive five stops two biscuits at a time, for the last stop three biscuits. Altogether it will receive 3+10+3 biscuits, namely sixteen biscuits as it was supposed to obtain.

Since the collection at each beat is, however, equal for all hoppers, each of these will distribute in the nine stops sixteen biscuits and in the interval considered nine stacker members will be filled wth sixteen biscuits. Meanwhile, the belt conveyor 5 will restore the loading in the hopper. Inside said hoppers, the height of the stack of products may vary, suitably adjusting, however, the speed range of the following-up packaging machine in relation to the speed of the feeder, establishing in the time an offtake of the product equal to its supply.

An operator can control, for example, visibly the product level inside the hoppers and add, possibly by hand, also some missing biscuits which have been previously eliminated because broken.

The stepwise operated or stepping conveyor 16 is mounted on the rotating supports 23a, 23b whereof the 23a is motorized for example in the ratio 1xn/4xn by a pair of pinions 24, 26 connected by a chain 25 and whereof the 24 derives the motion from a pinion 29 rigid therewith, connected with a chain 28 to another pinion 27 in the required ratio. The pinion 27 is rigid with a Maltese cross 30 engaged by a wheel 31 with pawls 131 motorized by a toothed wheel 33 rigidly coupled therewith and deriving in turn the motion from another toothed wheel 32 in the ratio 1/1 rigid with a cyclic shaft $A_3$ connected with the ratio 1/1 to the preceding cyclic shafts. The loaders or stacker members 15 provided with side opening 23 are fitted to the links of a chain 34 engaged in the toothed rims 34a, 34b presented by the aforesaid rotary supports 23a, 23b. Thanks to said kinematic connections the conveyor 16 will move stepwise as preestablished by the apparatus, one loader stopping each time in front of a hopper for transferring the articles from the hopper to the stacker member. The forward motion of the conveyor will take place during the return motion of pushers 14 to their initial position.

It is again pointed out that from the first to the last hopper, each stacker member will undergo the preestablished filling, receiving each time one article, more articles or no articles according to the program established by the contour of the cam 19. The bottom 15a of each loader is movable and engages, with the shank 115 (passing through said opening 23) and by means of the roller 215 with a fixed duct guide 35, which is arranged inclined over a section corresponding to the front of the conveyance zone. Because of such engagement during the forward motion of the belt there is inside the loader or stacker member a gradual lowering of the product pile to ensure the feeding of another product at each step. Instead of the movable bottom 15a, the loaders 15 could have a stationary bottom and be carried by the chain 34 wound like a closed ring over toother wheels the axes of which are situated at different levels. In such manner, the stepwise displacement from the higher to the lower level of the loaders would ensure the desired variation of the bottom of the loaders themselves.

Above the loaders in the direction of the forward motion there are arranged two feelers 36, 37, adapted to survey the access and the absence of part of the product in the loaders. Such feelers are coupled with microswitches 136, 137, controlling electrically the feed or supply circuit respectively of a device 38 with auxiliary loader for the supply of the missing items and analogous device 39 for the expulsion of the exceeding product.

In the motion reversing zone of the belt conveyor, in the initial solution, there are provided means for transferring the product to a second belt conveyor 40 in following-up connection with an automatic packaging machine. The motorization in phase of said second belt conveyor can be noticed from FIG. 3, in which the shaft $A_4$ for motorization of the auxiliary belt conveyor is controlled by the toother wheel 29 engaged by relevant Maltese cross.

At the transferring zone from one belt to the other (FIG. 2) there is present a system for cutting the wrapper and setting the cut sheets in the receiving seats of the auxiliary belt as may be seen from the diagrammatical representation in FIG. 2a at left of FIG. 2.

Said feed system comprises a bobbin of packaging sheet material 41 which is fed stepwise to the receiving seats of the conveyor 40 through at least two rollers 42–43. The roller 42 is carried freely rotatable by supports 44 which are in turn oscillatingly supported in 45 at a fixed point of the machine and are elastically urged towards the roller 43 by a spring 46. At least the roller 43 is a driving roller and is actuated stepwise by a connecting-rod and crank transmission 47–48 through a free trip mechanism 49. In the aforesaid FIGURE 2a there is shown a piston like member 50 the stem 51 of which is guided freely sliding in supports 52. Such piston member 50, actuated by means of well known type and not shown in the drawing, in synchronism with the stepwise motions of the tape of material 41 and of conveyors 40 and 16, is adapted to cause said packaging material 41 to adhere to the internal surface of the receiving space of the belt conveyor 40 which is arranged thereunder.

In phase to the movements of said means 41, 40–16 there are provided means for cutting from the continuous tape 41 the shaped material sections arranged in the corresponding receiving space, said cutting means being represented schematically in 53 of FIG. 2a by way of exemplification. It should be pointed out that in said FIG. 2a the piston part 50 and the receiving space of the conveyor 40 are represented rotated 90° relative to the plane of the belt 41.

The transferring of the articles of the loaders 15 to the conveyor 40, which articles in the initial phase of the inversion of the motion of the conveyor 16 are withheld in said loaders 15 by a fixed member 54 (see FIG. 3), is carried out by a pusher member 55 by causing them to pass over a plane 56 interposed between the same conveyors 16 and 40 (see FIG. 2). Said pusher 55 is provided in following-up connection with governing members of any known type whatever not represented, which governing members are provided in turn in following-up connection with electromagnetic control means operable in synchronism with the stepwise motion of the conveyors 16 and 40.

In FIGS. 4 and 4a there is represented a modification of the operating assembly of the movable support 13 described above with reference to FIG. 1 for the determination of the number of items to be transferred from containers 6 to the loaders 15 at each step of the conveyor 16. In such FIGS. 4 and 4a the parts equal or corresponding to those already described with reference to the aforesaid FIG. 1 retain the same reference number, followed, however, with an index.

From said figures it can be seen that with the cam 19' a rod 57 cooperates slideably guided in the fixed supports 58. Connected with said rod 57 via the connecting member 59 and the small connecting rod 60 is the end of one arm 61a of a three-arm member 61 rotating about an axis 62. The arm 61b of said member 61 is locked to the end of a spring 63 the other end of which is anchored to a fixed point 64. A cam 64a synchronized with the cyclic movement, acts on the arm 61b so as to determine the release of the rod 57 from the cam 19'. The third arm 61c of the member 61 is slideably engaged within the eyelet 65a of an articulated lever 65 which, with one of its ends is hinged in 66 to an arm 67a of a two-arm lever 67 rotating about an axis 68. The arm 67b of the two-arm lever 67 shows an eyelet 67c in which is adjustably engaged the end of a lever 69 the other end of which is fulcrumed in 70 on the arm 71a of a two-arm lever 71 rotating about the axis 72 and the other arm 71b of which cooperates with the cam 17' equivalent to the cam 17 described with reference to FIG. 1. In proximit yof the free end of the lever 65, along the corresponding eyelet 65a there is engaged in 72a the end of a lever 72 engaged with its other end in 73 to the end of the arm 74a of a two-arm lever 74 rotating about an axis 75. The arm 74b of said lever 74 is connected through the small connecting rod 76 to the rod 13f which carries the support 13'. With this kinematic mechanism, by positioning the end of the rod 69 in the eyelet 67c there is the possibility of adjusting the displacements of the support 13' so as to adapt same to the use for the handling of lots of items having a different thickness, maintaining the transferring law constant.

In FIG. 7 there is represented a modification for the transferring of the articles from containers 6 to loaders 15 according to three piles arranged side-by-side and with a passage order of the number of said articles being variable within each phase of the entire transferring cycle relatively to the individual couplings of containers-loaders. In said FIG. 7 there is indicated with 77 an endless belt conveyor on which there is defined by wall members 78 a plurality of compartments 79 having a width corresponding to three piles of items. Said compartments 79 correspond to the loaders 15 of the above-described example, and the belt conveyor 77 with which they are associated is provided with stepwise movements in an analogous manner to the conveyor 16 with which said loaders 15 are associated. Positioned above the aforesaid compartments or loaders 79 are the containers 80 corresponding to the containers 6 but having such a width as to contain three piles of articles. With each container 80 there is associated a support 81 equivalent to the support 13 and a pusher not visible in said FIG. 7 equivalent to the pusher 14. Said supports 81 cooperate with the lower end of the rod-shaped portion thereof with a corresponding cam 82 whereof the shaft 83 may be actuated in a closely analogous manner as the shaft of the cam 19 in synchronism with the movements of the pusher for example by the kinematic mechanism described above and represented in FIG. 1 or FIG. 4 and FIG. 4a. Said cams 82 are provided with such a contour as to determine the positioning of the associated support 82 to ensure the outgoing from the corresponding container 80 of no or one or more articles and are keyed on their actuating shaft 83 so as to obtain an outgoing sequence for a number of articles variable within each phase of the entire transferring cycle relatively to the individual couplings of containers 80-loaders 79. In the example shown in the aforementioned FIG. 7 the cams 82 are shown turned 90° in the figure and with the same contour but differently oriented on a common actuating shaft 83. In the specified case of four containers 80, the above cams 82 in following-up connection with relevant support 81 and which, in a rotation corresponding to a full loading cycle, take four different orientation positions are provided with such a contour as to ensure the outgoing of one item during three phases and two items during the fourth phase.

The different orientation of these cams causes evidently in a full cycle of four transferring phases a succession sequence of said phases of one or two items, such as to have for each phase the transfer of one article during three combinations container-loader and of two articles during one of said combinations. At the end of the cycle of four phases each combination container-loader will have carried out the transfer of five articles, namely three during the three phases relating to the transfer of one individual item and two during the transferring phase of two articles.

In the case in which the rows of articles to be piled are smaller than the piles obtainable by means of the containers 80 provision is made for the use of auxiliary hoppers 80a as shown in FIG. 7, whilst in the case in which said rows are provided in such a number as to obtain the number of piles provided by the containers 80 plus a fraction of piles, for the formation of the same container 80, said exceeding rows are excluded from the operating cycle of the apparatus.

With reference to FIGS. 8 and 9 there is shown a modification of the cam disc 19 operating with a fixed program. Instead of this disc there is provided a disc 19a having a series of holes F arranged along a circumference of the disc, which holes F provide seats for pins S, which are slidable and/or rotatable therein and which may be positioned in such a manner as to act on the tappet P which determines the position of the lower support member (bottom) for the biscuit within the hopper or container, allowing thus to vary the numbers of separated biscuits also during the operation of the machine. It is thus possible to select a program which is the most adapted for the array of biscuits which come from the oven.

As a further modification, the chain conveyor provided with the loaders for the biscuit piles instead to perform an intermittent motion, may be actuated with a uniform motion. In this embodiment the storing or collecting hoppers or containers are suspended in a pendulous manner and the relevant transferring mechanisms for the biscuits towards the loaders of the chain are also mounted on an oscillating equipment having such a motion as to accompany the motion of the chain during the transferring stage of the product towards the chain.

Analogously, the member which expels the piles of biscuits formed in the loaders of the chain, towards the (tape) devices provided with compartments, which follow for the direct feeding of a packaging machine, is also arranged in a pendulous manner aadpted to oscillate about the axis of the forward pinion, while it may be shifted transversely. The arrangement is such that while the said expeller member advances in the mentioned transversed direction it rotates simultaneously with the chain. This stage is so regulated that at the end of the transverse transferring the biscuits arrive on the supporting surface of the respective served compartment for the direct feeding of a packaging machine as above explained.

The accompanying transferring member is slipped off from the chain and is moved back to regain its position by rotating thus about its own axis.

The operation of the above-described apparatus may be easily deduced from the description and the accompanying drawing.

It will be understood that the above-mentioned accomplishment with relevant modifications is only given for exemplification purposes, and it is consequently obvious that in the spirit of the invention as described and claimed there may be provided in practice several changes and modifications with particular regard to the construction details without departing from the inventive concept.

What is claimed is:

1. An apparatus for grouping articles into a plurality of piles containing a preestablished number of articles collected from different rows of articles coming from a previous articles processing stage and for conveying them to a subsequent packaging machine, comprising: a plurality of first conveyor means having each an inlet and an outlet end, near said outlet end of each of said conveyor means a substantially vertical hopper member having a bottom opening beneath the outlet end of each of said conveyor means, a vertically movable bottom plate member underneath said bottom opening, means for vertically moving said bottom plate member towards and away from said bottom opening and maintain said bottom plate member at preestablished different levels with respect to said bottom opening, said hopper members allowing the articles fed by said first conveyor towards said hopper members to fall within said hopper members and stack upon said bottom plates to form an intermediate pile of articles at least partially within each of said hopper members and resting on said bottom plate member, said first conveyor means being arranged in side by side relationship and determining a corresponding plurality of rows of conveyed articles, a stepping conveyor having an input and an output end and extending transversely of said first conveyor means in front of the bottom openings of said hopper members and having a series of stacker members passing below said bottom openings of said hopper members when the stepping conveyor is moved to collect articles delivered from a number of said hopper members and to stack said articles on said stacker members, means cooperating with said stepping conveyor to guide said stacker members along a sloping path thereby to increase the level difference between said bottom openings and said stacker members, when said stacker members are moved from the input and towards the output end of said stepping conveyor, pusher means near each of said bottom plates to push a preestablished number of articles from said hopper members onto the corresponding stacker members and expeller means near said output end of said stepping conveyor to expel the articles stacked within said stacker member therefrom and to deliver them to a subsequent packaging equipment.

2. An apparatus according to claim 1, wherein said means for vertically moving said bottom plates towards and away from the corresponding bottom openings and maintain said bottom plates at preestablished different levels with respect to said bottom opening comprise for each bottom plate, a rotating cam and follower means cooperating with said cam and connected with said bottom plate.

3. An apparatus according to claim 2, wherein said cam comprises a plurality of pins defining the profile of the cam.

4. An apparatus according to claim 2, wherein said bottom plate member has a comb-like structure with comb teeth extending towards said second conveyor and said pusher means having a comb-like structure with teeth parallel to the teeth of said bottom plate member and registering with the interspaces between the teeth thereof, said pusher means having a bent end portion facing said second conveyor and extending transverse to the teeth of said bottom plate member.

5. An apparatus according to claim 1, wherein of said first conveyor means comprise at least two aligned conveyor means defining a gap therebetween less than that dimension of the article which extends in the advancing direction of the conveyors to allow the non correct articles to fall through said gap.

6. An apparatus according to claim 5, wherein said two aligned conveyors the foremost in the direction of advancement of the articles has a tiltable end section to direct the articles conveyed by said foremost conveyor out of reach of the other of said two conveyors.

7. An apparatus according to claim 1, wherein said second conveyor and said stacker members comprise connecting means slidably connecting said stacker members with said stepping conveyor in a direction transverse thereto, and further comprising stationary guide means for said stacker members and extending in a sloping direction thereby to lower said stacker members as they are moved by said stepping conveyor, past said hopper members.

References Cited

UNITED STATES PATENTS

| | | | |
|---|---|---|---|
| 1,330,639 | 2/1920 | Leumann. | |
| 1,834,723 | 12/1931 | Neff | 221—238 X |
| 1,886,378 | 11/1932 | Dearsley | 198—35 X |
| 2,576,366 | 11/1951 | Smith | 198—24 X |
| 3,106,315 | 10/1963 | Bailey | 198—24 X |

FOREIGN PATENTS

| | | |
|---|---|---|
| 442,961 | 4/1927 | Germany. |
| 1,001,036 | 5/1963 | Great Britain. |

EVON C. BLUNK, *Primary Examiner.*

M. L. AJEMAN, *Assistant Examiner.*